United States Patent Office

2,749,242
Patented June 5, 1956

2,749,242

CONVERSION OF LACTOSE TO GLUCOSE, GALACTOSE AND OTHER SUGARS IN THE PRESENCE OF LACTASE ACTIVATORS

Edwin G. Stimpson, Sayville, N. Y., and Olof E. Stamberg, Danville, Ill., assignors to National Dairy Research Laboratories, Inc., Oakdale, N. Y., a corporation of Delaware No Drawing. Application December 24, 1952,
Serial No. 327,912

18 Claims. (Cl. 99—55)

This invention relates to the enzyme hydrolysis of lactose to glucose and galactose and, more particularly, to a process of treating milk products with lactase to convert the major proportion of the lactose therein to glucose and galactose with the aid of a lactase activator.

Milk products contain a high proportion of lactose which for various reasons has limited the utilization of such products. Lactose has a relatively low solubility in water and for this reason milk products cannot be brought to a high solids content without danger of crystallization of lactose. Similarly, in the manufacture of ice cream at low temperatures, lactose will crystallize on storage and produce a so-called "sandy" ice cream. Moreover, lactose has a disadvantageous cathartic effect and the utilization of milk products in the preparation of animal feeds is hampered because the maximum amount of a milk product which can be incorporated in the diet is severely limited by the amount of lactose which can be tolerated by the animal.

Various methods have been proposed to prevent or overcome lactose crystallization. According to Patent No. 2,360,033 to Baumann, dated March 3, 1941, if milk is heated at 220° to 260° F. under pressure, lactose will be hydrolyzed to a combination of simple sugars. But at these temperatures milk coagulates and thus the process is of limited utilization. Patent No. 2,433,850 to Leviton, dated June 22, 1943, suggests that riboflavin will retard crystallization of lactose in ice cream, but riboflavin is an expensive material. Patents Nos. 2,233,178 and 2,307,234 to Otting and Quilligan, dated respectively January 6, 1939 and July 20, 1940, suggest the treatment of milk with an ion exchange material, but such a method changes the proportions of milk solids to each other and alters the chemical nature of the salts present in milk.

Other methods of hydrolyzing lactose have been suggested. Patent No. 783,015 to Britt, dated April 22, 1904, employs electrolysis and Patents Nos. 1,414,214 and 2,117,681 to Sanna et al., dated respectively January 19, 1921 and August 11, 1936, suggest the use of heat with an acid. None of these methods, however, has come into general use.

According to Patent No. 1,737,101 to G. D. Turnbow, dated November 26, 1929, the lactose present in milk can be hydrolyzed to simple sugars more soluble in water than lactose through use of lactase enzyme. In the process of this patent the lactase enzyme preparation is added to unpasteurized unconcentrated skim milk, which is then incubated at 158° F. or like elevated temperature until the desired amount of hydrolysis has taken place. This patent asserts that it is possible in this way to hydrolyze as much as 30% of the lactose, and this yield has been confirmed by independent experimentation. However, a 30% yield is too low to be practical in a commercial process. Also, for some uses if lactose crystallization is to be prevented it is essential that a major proportion of the lactose in the milk product be hydrolyzed to glucose and galactose. Moreover, available lactase enzyme preparations frequently impart an undesirable flavor to the milk treated therewith and this has limited the use of the lactase-hydrolyzed product to non-human foods.

According to the instant invention the lactose present in milk is hydrolyzed to glucose and galactose, as well as polymerization or addition products thereof with the aid of a lactase enzyme system in the presence of an activator for the lactase enzyme system which appreciably improves the extent of hydrolysis and makes possible conversion of upwards of 85% of the lactose without the need for special treating conditions such as prior concentration of the milk product to increase the solids content, or a heat treatment. The process of the invention does not appreciably change either the total carbohydrate content of the milk produce or the proportion of the carbohydrate to other components of the milk product.

The process is simply carried out by adding a lactase enzyme system to the milk product and holding the mixture under conditions favoring lactase hydrolysis of lactose to simple sugars including glucose and galactose and polymerization or addition products thereof in the presence of an activator for the lactase enzyme.

The invention is particularly applicable to cows' milk. However, the term "milk" as commonly used refers to the normal secretion of the mammary glands of a mammal, and al milks contain an appreciable lactose content. The process of the invention may be employed to reduce the lactose content without reducing the total sugar content of any milk including, in addition to cows' milk, mares' milk, goats' milk, ewes' milk, etc.

The term "milk product" is used generically in the specification and claims to refer not only to whole milk and skim milk, but also to the lactose-containing products derived from any of the above milks, including whey derived from casein or cheese manufacture, the mother liquor wash water obtained as a waste product in the production of lactose from whey or milk producs, and lactalbumin mother liquors such as those obtained following the precipitation of lactalbumin. All milk products which contain lactose can be treated by the process of the invention to reduce the lactose content thereof.

A wide variety of lactase activators can be employed in the process of the invention. All of these compounds are characterized by being sufficiently soluble in water to improve the yield of the hydrolysis products obtained in the process.

Sulfur compounds which contain an active hydrosulfide —SH group or a sulfite group are preferred, but in general, any soluble sulfur-containing acid or acid-forming gas, such as hydrogen sulfide and sulfur dioxide, or salt thereof, as a soluble sulfide, hydrosulfide, sulfite, bisulfite, metabisulfite and hyposulfite, can be used. Exemplary are sodium sulfide, sodium hydrosulfide, cysteine, glutathione, sodium thioglycollate, sodium bisulfite, sodium thiosulfate, potassium sulfide, potassium hydrosulfide, potassium bisulfite, potassium thiosulfate, sodium sulfite, sodium metabisulfite, sodium hyposulfite, potassium metabisulfite, potassium hyposulfite, potassium thioglycolate, calcium bisulfite, barium bisulfite, zinc hyposulfite, calcium hydrosulfide and barium hydrosulfide. The sulfates and sulfuric acids are not effective.

It is of course evident that unless the activator can be removed from the milk product upon completion of the hydrolysis it is necessary that the activator be edible. If desired, sulfites and sulfides can be removed upon completion of the reaction by driving out hydrogen sulfide or sulfur dioxide from the aqueous medium, as by aeration, and the metal cation which remains is not harmful, but this is not essential, and in some cases, as where the product is to be fed to ruminant animals, it may be advantageous to retain some or all of the sulfur in the medium.

Any amount of activator will improve the hydrolysis. Usually however it is desirable to add at least about 0.02% in order to effect a hydrolysis of at least 50% of the lactose present. If it is desired to carry the hydrolysis as far towards completion as possible it is desirable to employ from about 0.025 to 6.0% activator. These weights are based on the amount of lactose present in the milk product.

Some activators in addition to activating the lactase hydrolysis of lactose are antibacterial in nature and therefore have a preservative effect upon the milk product. The lactase enzyme system operates at a peak of efficiency when the milk product has a pH within the range of 6.0 to 7.5 and when dealing with raw whey or other unpasteurized milk products, the acid-producing bacteria present therein should be inhibited during the period of enzyme activity so that the pH of the mixture does not shift to values outside this range.

Accordingly, activators which combine an anti-bacterial activity can be added in amounts sufficient not only to activate the lactase hydrolysis but also to take advantage of their preservative or bacterial-inhibitive action. Of course other preservatives and bacterial inhibitors can be added if desired, but it is obviously advantageous to utilize an additive which combines both antibacterial and lactase activator properties. Additional preservatives which are not lactase activators but which can be used include hydrogen peroxide, toluene, penicillin, thymol and phenol. Formaldehyde and chloroform adversely affect lactase activity and should not be used.

The lactase activator can be added to or incorporated in the milk product at any time before the hydrolysis is begun. To take advantage of its preservative or bacterial inhibitive action, the activator can be incorporated in the milk product as soon as the product is available, even though the hydrolysis may not be carried out for some time thereafter; in this event, however, it may be necessary to add an additional amount of activator just before hydrolysis is begun since part of the activator may be consumed during the storage period. For instance, it can be incorporated in whey at the cheese plant. Usually it is desirable to add the activator just before or at the same time as adding the lactase enzyme since the hydrolysis reaction will begin immediately after incorporation of the enzyme, if other conditions are suitable.

The milk product whose lactose content is to be hydrolyzed can be of normal solids content. However, if desired, the product can be concentrated to a higher solids content, say 20% or as high as 30 to 45% by weight. Concentration can be carried out in vacuo at a temperature within the range from 90 to 135° F. Concentrated products lend themselves especially to hydrolysis at the higher temperatures i. e., 123° F. and above.

The milk product can be raw or it can be pasteurized prior to inoculation with the lactase enzyme, but pasteurization is not necessary. Moderate heat treatment serves the purpose of a bacterial control prior to enzyme hydrolysis, and this obviates the need for bactericidal agents. Heating for a time and at a temperature along or below the curve described by the upper limit of 175° F. for fifteen seconds and at 125° F. for thirty minutes or less is effective to reduce bacterial action. The heat treatment or pasteurization is thought to improve hydrolysis by destroying or inactivating some material present in the milk product which represses enzyme activity. The milk product can also be both heat-treated or pasteurized and concentrated, if desired.

After any preparatory steps desired have been taken, a lactase enzyme preparation is added to the milk product which is then held under conditions favoring lactase hydrolysis of lactose. Temperatures over a wide range, from 25° to 135° F., may be employed. At temperatures below 25° F. lactase activity is so slow as to be almost negligible. Even at 25° F. from seven to ten days may be necessary for hydrolysis to reach its fullest extent. Holding at temperatures above 135° F. will inactivate the enzyme. Hydrolysis reaches its fullest extent in from four to five hours at temperatures from 105° to 118° F., and therefore temperatures within this range are preferred.

The amount of enzyme added to the milk product will depend upon the potency of the lactase preparation and the amount of lactose in the milk product, as well as the proportion of lactose that must be hydrolyzed. Thus the amount of enzyme used may be widely varied, but in general from 1.5% to 3% of enzyme by weight of the quantity of lactose present in the milk product is employed to achieve substantially complete, i. e., over 85% hydrolysis of the lactose.

The hydrolysis may be halted at any time, as after the hydrolysis has proceeded to the desired extent by treating the mixture to inactivate the lactase enzyme. Pasteurization by a holding method, as for example heating the mixture at 160° F. for thirty minutes, is effective for this purpose, but drying the mixture at a sufficiently elevated temperature, say above about 145° F., will also inactivate the enzyme. If the mixture is frozen and stored at 0° F. or below, enzyme activity is arrested but will resume when the mixture is reheated to room temperature or above.

Dependent upon its end use, the hydrolyzed product may be further concentrated, if desired, for storage or shipping purposes, or it may be frozen or dried by any convenient method, such as in a tray or spray drier.

If the product is brought to a temperature at which acid-producing bacteria will grow, the pH can be lowered to 4.5 or below, and the product condensed to a solids content in the range of 30 to 55%, at which pH and concentration the product can be preserved indefinitely. The sugar content of the material also assists in preserving the material, especially at the higher solids content.

Milk products prepared in accordance with the above procedure may contain as little as 10% of the lactose originally present, the remainder of the sugar content thereof consisting of simple sugars including glucose and galactose as well as polymerization and addition products thereof. However, products containing any desired larger proportions of lactose to glucose and galactose may be prepared by adjusting the amount of enzyme added or controlling the incubation conditions, or by arresting the hydrolysis at the desired stage.

Any lactase enzyme preparation known to the art may be employed in the process of the invention. It is essential, however, if the lactase is derived from bacteria, yeasts or molds, that the lactase be uncontaminated with those enzyme systems which convert glucose and galactose to carbon dioxide and alcohol. This type of enzyme system is termed "zymase" by the art and it will be understood that lactase preparations derived from yeast and employed in the process of the invention must be zymase-inactive in order to prevent conversion of glucose and galactose arising from hydrolysis to carbon dioxide and alcohol. If the zymase contained in the yeast is inactive, it is not necessary to separate the lactase from the yeast.

Among the yeasts which may be employed as the source of lactase enzyme are NRRL Y 665 *Saccharomyces fragilis*, NRRL YL 28 *Torulopsis spherica*, NRRL YL 36 *Zygosaccharomyces lactis* and strains of *Torula utilis* or *Candida pseudotropicalis* adapted to the utilization of lactose for growth and fermentation. A lactase enzyme obtained from suitable bacteria, as a *Lactobaccillus bulgaricus*, or from a suitable mold such as *Aspergillus oryzae*, may also be used.

The zymase may be destroyed without destroying the lactase by drying the yeast under carefully controlled conditions, or by plasmolyzing the yeast with an organic solvent, such as toluene, chloroform or ethyl ether, or by heating the yeast at 123° F. in a medium whose pH is about 7.

A stable potent lactase enzyme preparation of bland flavor and good stability can be prepared as follows:

EXAMPLE 1

The solids content of whey derived from casein or cheese manufacture is adjusted to 2 to 8% by weight, and its pH is brought to within the range from 4.5 to 7.0, either by addition of lime or lactic acid or by inoculation with lactic acid-producing bacteria. The whey is then heated at 185° F. for thirty minutes in order to coagulate the protein, and the coagulated protein is separated by decantation or filtration.

The deproteinated whey is pasteurized by heating at 145° F. for forty-five minutes or at 160° F. for fifteen minutes or at 175° F. for ten seconds, and its pH is taken to be sure it is within the range of 3.5 to 7.5. Preferably the pH of the whey is brought to 4.5. The whey is then inoculated with yeast of a lactase producing strain, such as *S. fragilis*, and allowed to ferment from ten to thirty hours at a temperature of approximately 86° F. During the fermentation it is desirable to aerate the medium with from 0.009 to 0.5 volume of air per volume of medium per minute.

The yeast cells are separated from the fermentation liquor and washed with warm water.

The yeast is then dried in any of several ways. Freeze drying in vacuo at 0 to 30° F. is particularly advantageous. The yeast may also be spray-dried if it is dispersed in water to form a yeast cream of from 10 to 18% solids content. The yeast cream is fed into a spray drier whose inlet air stream is at a temperature of about 250° F. and whose outlet air stream is at approximately 170° F. The dry yeast powder is cooled to room temperature as quickly as possible after leaving the spray drier and is stored at 40° F. until use.

The yeast may also be dried in a tray drier provided the temperature does not exceed 150° F. The drying cycle should be completed in about two and one half hours in an atmospheric tray drier or in about four hours in a vacuum tray drier.

The drying temperatures and times above given are applicable to any lactase-containing yeasts but they must be carefully controlled within the ranges given in order the keep the loss of lactase enzyme activity at a minimum and produce a dry enough product. During the drying operation the zymase is rendered inactive but lactase activity is substantially unaffected. Thus the dry product from either the tray or spray drier may be used as a lactase enzyme preparation in the process of the invention. Such a use of this preparation is illustrated in subsequent examples.

The lactase enzyme preparation obtainable by the above process has strong potency and good stability. It has a good light color and a bland flavor, and does not impart an undesirable flavor to milk products in which it is incorporated.

The following examples illustrate preferred embodiments of the process of the invention:

EXAMPLE 2

Unpasteurized fresh cheddar cheese whey was brought to 115° F. and sodium sulfide added with gentle air agitation to provide mixing. Two pounds of sodium sulfide in solutions were added to each 10,000 gallons of whey. The mixture was then allowed to stand for twenty to thirty minutes to effect bacteriostatic and/or bactericidal action on the whey. The whey then was neutralized with a caustic soda solution to 0.08% acid as lactic (ph. 6.8). A dispersion of two parts of lactase yeast powder, prepared as set forth in Example 1, to each 100 parts of whey solids was mixed in water and the slurry was passed through a Homoloid homogenizer to prepare a uniform dispersion. This dispersion was added to the whey with the aid of gentle air agitation to get a uniform mixture. During mixing the temperature was held at 115° F. and the mixture allowed to stand for three to four hours at this temperature with very slight agitation. At the end of this time the hydrolysis had reached 85%.

Air was vigorously bubbled through the solution to remove hydrogen sulfide, whereupon bacterial action revived and acid production took place. This was allowed to proceed until approximately 0.5% acid had developed at which time the mixture was heated to over 140° F. The material then was condensed under vacuum to a solids content of approximately 55%.

EXAMPLE 3

Example 2 was repeated using an unpasteurized cheddar cheese whey whose acidity had increased appreciably due to spontaneous or random bacterial growth. Before adding sodium sulfide the whey was brought to an acidity of approximately 0.15% as lactic acid by addition of alkali (pH 6.8). The whey was again brought to 0.08% acid, and the process was then carried out as set forth. Hydrolysis of 85% was obtained. The product was condensed to 65% solids.

EXAMPLE 4

To fresh unpasteurized cheddar cheese whey at the cheese plant one and one half pounds of sodium bisulfite were added to each 1,000 gallons of whey to inhibit acid-producing bacteria. After collection and transport to the whey manufacturing plant the whey had not developed an appreciable acidity. The temperature was increased to 115° F., the whey then brought to a pH of 6.8 by addition of caustic soda, the enzyme slurry added and the hydrolysis effected as set forth in Example 2. At the end of four hours a 90% hydrolysis had been effected. Air was bubbled through the solution as before to blow out sulfur dioxide and destroy the sulfite, and the product condensed to 30% solids and spray-dried.

EXAMPLE 5

Example 4 was repeated. However, the whey from the cheese plant had been stored for over sixteen hours before it could be processed and consequently two ounces of sodium sulfite were added before addition of the enzyme slurry. Here likewise a 90% hydrolysis was obtained.

EXAMPLE 6

To fresh unpasteurized cheddar cheese whey at the cheese plant was added seven quarts of 35% aqueous hydrogen peroxide solution for each 3,000 gallons to preserve it from bacterial action during a twenty-four hour storage period at atmospheric temperatures prior to delivery to the whey processing plant. Upon arrival at the whey processing plant it was sweet and ready for hydrolysis. One pound of sodium sulfide was added to each 300 gallons and the temperature brought to 123° F. after which caustic soda was added in an amount to adjust the pH to 6.8. Lactase yeast enzyme prepared as set forth in Example 1 was added at a proportion of thirty pounds for each 3,000 gallons and the mixture held at 115° F. for four hours at the end of which time hydrolysis exceeded 95%. Air was vigorously bubbled through the mixture to blow out hydrogen sulfide and the process completed as in Example 4.

EXAMPLE 7

To fresh unpasteurized skim milk was added two pounds of sodium sulfide for each 10,000 gallons and the mixture brought to a temperature of 115° F. Lactase yeast enzyme prepared as set forth in Example 2 was added in the ratio of eighty-five pounds as a well-mixed slurry in thirty gallons of water for each 10,000 gallons of milk. The mixture was allowed to stand at 115° F. for four hours at the end of which time hydrolysis was 90% complete. The mixture was pasteurized at 160° F.

for thirty minutes, and condensed by conventional procedures in a double effect vacuum pan to 60% solids.

EXAMPLES 8 TO 23

In Tables I and II is reproduced data on the hydrolysis of unpasteurized skim milk and fresh unpasteurized cheddar cheese whey using the activators listed. The amounts of the activator are given in parts per million. The hydrolyses of Examples 8 to 15 were conducted at 115° F. at a pH of 6.4 to 6.8 for four hours, and the hydrolyses of Examples 16 to 23 were conducted at 123° F. at a pH of 6.8 for four hours. In all these examples two parts of lactase enzyme were used for each 100 parts of lactose.

Examples 14 and 17 show that sodium chloride and sodium sulfate are not effective lactase activators. Of the others, sodium sulfide (Example 8), cysteine hydrochloride (Example 9), sodium sulfite (Examples 12 and 18), sodium bisulfite (Example 13), potassium metabisulfite (Example 15) and sodium hydrosulfite (Example 19) are the most effective.

*Table I*

HYDROLYSIS[1] OF UNPASTEURIZED SKIM AND CHEDDAR CHEESE WHEY USING LACTASE YEAST AND LACTASE ACTIVATORS

[Percent hydrolysis at parts per million.]

| Ex. No. | Additive | Substrate | 5 p.p.m. | 50 | 100 | 250 | 375 | 500 | 650 | 750 | 1,000 | 1,500 | 3,000 | 5,000 | 10,000 | 15,000 |
|---|---|---|---|---|---|---|---|---|---|---|---|---|---|---|---|---|
| Control | | milk | | | | 30 | | | | | | | | | | |
|  | | whey | | | | 30 | | | | | | | | | | |
| 8 | Sodium sulfide | milk | | | | 83 | | 83 | | | | | | | | |
|  | | whey | 35 | 61 | 76 | 86 | | | | | | | | | | |
| 9 | Cysteine hydrochloride | milk | | | 62 | 60 | | 73 | 60 | | | 74 | 74 | | | |
|  | | whey | 30 | 78 | 78 | | | | | | | | | | | |
| 10 | Glutathione | milk | | | 55 | 60 | 59 | 55 | | 85 | | 85 | | | | |
|  | | whey | 30 | 37 | 35 | | 52 | 62 | | 75 | | 80 | | | | |
| 11 | Sodium thioglycollate | milk | | | 42 | 38 | | 46 | | | | | | | | |
|  | | whey | | | 38 | 40 | | 32 | | | | | | | | |
| 12 | Sodium sulfite | milk | | | | 86 | | 80 | | | | | | | | |
|  | | whey | | | | 90 | | | | | | | | | | |
| 13 | Sodium bisulfite | milk | | | | | | | | | | | | 58 | 58 | |
|  | | whey | 44 | 75 | 75 | | | | | | | | | | | |
| 14 | Sodium chloride | milk | | | | | | | | | | | | 34 | 30 | 20 |
|  | | whey | | | | | | | | | | | | 25 | 18 | 18 |
| 15 | Potassium metabisulfite | milk | | | 91 | 93 | | 93 | | | | | | | | |
|  | | whey | 41 | 72 | 80 | 86 | | 86 | | | | | | | | |

[1] Hydrolysis conducted at 115° F./4 hours.

*Table II*

HYDROLYSIS[1] OF UNPASTEURIZED CHEDDAR WHEY USING YEAST LACTASE ENZYME AND LACTASE ACTIVATORS

| Ex. No. | Additive | Percent Hydrolysis at— | |
|---|---|---|---|
| | | 50 p.p.m. | 100 p.p.m. |
| Control | | | 34 |
| 16 | Sodium tetrasulfide ($Na_2S_4$) | 37 | 48 |
| 17 | Sodium sulfate ($Na_2SO_4$) | 31 | 31 |
| 18 | Sodium sulfite ($Na_2SO_3$) | 73 | 73 |
| 19 | Sodium hydrosulfite ($Na_2S_2O_4$) | 73 | 77 |
| 20 | Sodium thiosulfate ($Na_2S_2O_3 \cdot 5H_2O$) | 57 | 52 |
| 21 | Sodium thioglycollate ($NaSC_2H_3O_2$) | 36 | 36 |
| 22 | Hydrogen sulfide ($H_2S$) | 15 secs. 52 | 30 secs. 64 |
|  |  | 30 secs. |  |
| 23 | Sulfur dioxide ($SO_2$) | 69 | |

[1] Hydrolysis conducted at 123° F./4 hours.

EXAMPLES 24 TO 26

Table III shows the effectiveness of 48 parts per million of sodium bisulfite, sodium hydrosulfite and sodium thiosulfate in improving lactase enzyme efficiency as compared to untreated unpasteurized skim milk. The table also points out the ineffectiveness of 500 parts per million of 35% hydrogen peroxide with regard to increase in lactase activity. The hydrogen peroxide was, however, effective as a bacterial retardent.

*Table III*

[Unpasteurized skim milk pH 6.7, 1 part lactase per 40 parts lactose, 123° F.]

| | Percent Hydrolysis | | | | |
|---|---|---|---|---|---|
| | Control | $H_2O_2$[1] | Ex. 33— Hydrosulfite[2] | Ex. 34— Bisulfite[2] | Ex. 35— Thiosulfate[2] |
| 2 hrs. hydrolysis | 22 | 25 | 43 | 52 | 42 |
| 4 hrs. hydrolysis | 24 | 30 | 62 | 62 | 48 |

[1] 2 quarts $H_2O_2$ per 1,000 gallons.
[2] 48 parts per million.

EXAMPLE 27

Table IV shows how increasing amounts of iron and copper serve to decrease the lactase enzyme activity when present in raw whole milk. This table also shows how 1,000 parts per million of sodium sulfide can offset the inhibiting effect of 50 p. p. m. of iron and simultaneously activate the lactase. A similar effect is found when 1,000 p. p. m. of bisulfite are used but this chemical is not quite as effective as the sodium sulfide.

The same general conclusions can be drawn when 1,000 p. p. m. of sodium sulfide or bisulfite are added to raw milk contaminated with copper but the copper is so efficient an inhibitor that lactase activation is much less pronounced.

*Table IV*

[Unpasteurized whole milk used four hours after milking, pH 6.75, temp. 123° F., 1 part lactase per 40 parts lactose, two hours hydrolysis.]

| | Iron Additions, Percent Hydrolysis | Copper Additions, Percent Hydrolysis |
|---|---|---|
| Unpasteurized milk (control) | 38 | 38 |
| Unpasteurized milk+5 p. p. m. metal ion | 35 | 18 |
| Unpasteurized milk+50 p. p. m. metal ion | 22 | 3 |
| Unpasteurized milk+200 p. p. m. metal ion | 16 | |
| Unpasteurized milk+400 p. p. m. metal ion | 2 | |
| Unpasteurized milk+50 p. p. m. metal ion+ 0.1 g. $Na_2S$ | 60 | 41 |
| Unpasteurized milk+20 p. p. m. metal ion+ 0.1 g. sodium bisulfite | 45 | 27 |

EXAMPLE 28

Table V shows in more detail amounts of sodium sulfide which activate iron- and copper-containing milk with respect to lactase enzyme activity.

Table V

[Unpasteurized whole milk, pH 6.75, temp. 123° F., 1 part lactase per 40 parts lactose, two hours hydrolysis.]

| | Percent hydrolysis |
|---|---|
| Unpasteurized milk | 32 |
| Unpasteurized milk + 100 p. p. m. iron | 22 |
| Unpasteurized milk + 100 p. p. m. iron + 0.5 mg. $Na_2S$ | 34 |
| Unpasteurized milk + 100 p. p. m. iron + 1.0 mg. $Na_2S$ | 50 |
| Unpasteurized milk + 100 p. p. m. iron + 2.0 mg. $Na_2S$ | 54 |
| Unpasteurized milk + 100 p. p. m. iron + 4.0 mg. $Na_2S$ | 55 |
| Unpasteurized milk + 100 p. p. m. iron + 6.0 mg. $Na_2S$ | 57 |
| Unpasteurized milk + 20 p. p. m. copper | 8 |
| Unpasteurized milk + 20 p. p. m. copper + 0.5 mg. $Na_2S$ | 10 |
| Unpasteurized milk + 20 p. p. m. copper + 1.0 mg. $Na_2S$ | 12 |
| Unpasteurized milk + 20 p. p. m. copper + 2.0 mg. $Na_2S$ | 22 |
| Unpasteurized milk + 20 p. p. m. copper + 4.0 mg. $Na_2S$ | 43 |
| Unpasteurized milk + 20 p. p. m. copper + 6.0 mg. $Na_2S$ | 55 |

EXAMPLE 29

Table VI is similar to Table V except for the substitution of sodium bisulfite in place of sodium sulfide.

Table VI

[Unpasteurized whole milk, pH 6.75, temp. 123° F., 1 part lactase per 40 parts lactose, two hours hydrolysis.]

| | Percent hydrolysis |
|---|---|
| Unpasteurized milk | 18 |
| Unpasteurized milk + 100 p. p. m. iron | 14 |
| Unpasteurized milk + 100 p. p. m. iron + 0.5 mg. sodium bisulfite | 22 |
| Unpasteurized milk + 100 p. p. m. iron + 1.0 mg. sodium bisulfite | 25 |
| Unpasteurized milk + 100 p. p. m. iron + 2.0 mg. sodium bislufite | 30 |
| Unpasteurized milk + 100 p. p. m. iron + 4.0 mg. sodium bisulfite | 32 |
| Unpasteurized milk + 100 p. p. m. iron + 6.0 mg. sodium bisulfite | 34 |

EXAMPLE 30

Table VII shows how hydrogen peroxide can be used as a preservative in the presence of sodium sulfide, but shows that at the levels of 1,000 to 5,000 p. p. m. of 35% $H_2O_2$ in unpasteurized skim milk the effectiveness of the sulfide will be decreased at least for an addition of 10 p. p. m. of sulfide.

Table VII

[Unpasteurized skim milk pH 6.70, 115° F., 1 part lactase per 40 parts lactose, four hours hydrolysis.]

| | Percent Hydrolysis | |
|---|---|---|
| | 2 hrs. | 4 hrs. |
| Unpasteurized milk | 32 | 35 |
| Unpasteurized milk+1 mg. $Na_2S$ | 70 | 95 |
| Unpasteurized milk+1 mg. $Na_2S$+0.1 ml. 35% $H_2O_2$ | 44 | 72 |
| Unpasteurized milk+1 mg. $Na_2S$+0.2 ml. 35% $H_2O_2$ | 42 | 75 |
| Unpasteurized milk+1 mg. $Na_2S$+0.3 ml. 35% $H_2O_2$ | 38 | 63 |
| Unpasteurized milk+1 mg. $Na_2S$+0.4 ml. 35% $H_2O_2$ | 25 | 60 |
| Unpasteurized milk+1 mg. $Na_2S$+0.5 ml. 35% $H_2O_2$ | 22 | 48 |

In the presence of hydrogen peroxide, the effect of sulfide is decreased.

EXAMPLE 31

Table VIII shows that copper and iron contamination of unpasteurized skim milk up to 5 p. p. m. and 100 p. p. m., respectively, does not reduce the effectiveness of 10 p. p. m. of sodium sulfide in obtaining full activity in the face of the stated metal contamination.

Table VIII

[Unpasteurized skim milk 115° F., 1 part lactase per 40 parts lactose, at one, two and four hours hydrolysis.]

| | Percent Hydrolysis | | |
|---|---|---|---|
| | 1 hr. | 2 hrs. | 4 hrs. |
| Unpasteurized milk | 42 | 64 | 72 |
| Unpasteurized milk+100 p. p. m. iron | 38 | 52 | 48 |
| Unpasteurized milk+5 p. p. m. copper | 48 | 54 | 62 |
| Unpasteurized milk+1 mg. $Na_2S$ | 57 | 73 | 98 |
| Unpasteurized milk+100 p. p. m. iron+1 mg. $Na_2S$ | 58 | 68 | 99 |
| Unpasteurized milk+5 p. p. m. copper+1 mg. $Na_2S$ | 50 | 60 | 88 |

Here the sodium sulfide was able completely to overcome the inhibitory effect of the iron and copper, and the results in the case of iron were as good as when iron was not present.

EXAMPLE 32

In Table IX is shown the effectiveness of 100 to 900 p. p. m. of sodium bisulfite and sodium sulfide (nine waters) to prevent bacterial action (i. e., acid development) especially over an initial four hour period.

Table IX

ACID DEVELOPMENT OF WHEY IN THE PRESENCE OF SODIUM BISULFITE AND SODIUM SULFITE

| Time | Temp., °F. | No Addition | Sodium Bisulfite, Percent | | | | Percent $Na_2S$—$9H_2O$ | | | |
|---|---|---|---|---|---|---|---|---|---|---|
| | | | 0.01 | 0.03 | 0.06 | 0.09 | 0.01 | 0.03 | 0.06 | 0.09 |
| | 90 | 0.21 | 0.21 | 0.23 | 0.26 | 0.28 | 0.21 | 0.21 | 0.21 | 0.20 |
| hrs | 85 | 0.30 | 0.21 | 0.23 | 0.25 | 0.28 | 0.21 | 0.21 | 0.21 | 0.21 |
| 16 hrs | 83 | 0.46 | 0.37 | 0.22 | 0.25 | 0.27 | 0.44 | 0.29 | 0.27 | 0.25 |
| 22 hrs | 76 | 0.51 | 0.42 | 0.25 | 0.26 | 0.28 | 0.46 | 0.35 | 0.27 | 0.26 |
| 38 hrs | 76 | 0.56 | 0.49 | 0.33 | 0.27 | 0.26 | 0.47 | 0.41 | 0.30 | 0.29 |

The whey was mixed only when samples were taken for acid tests. Acid expressed as per cent lactic acid.

EXAMPLE 33

EFFECT OF TEMPERATURE ON LACTASE HYDROLYSIS OF UNPASTEURIZED SKIM MILK AND WHOLE MILK IN PRESENCE OF LACTASE ACTIVATORS

| Activator (100 p.p.m.) | Skim Milk Percent Hydrolysis at— | | | | | Whole Milk Percent Hydrolysis at— | | |
|---|---|---|---|---|---|---|---|---|
| | 40°F. | | | 115°F., 4 hrs. | 123°F., 4 hrs. | 40°F., 5 days | 115°F., 4 hrs. | 123°F., 4 hrs. |
| | 1 day | 2 days | 4 days | | | | | |
| | Percent | Percent | Percent | Percent | Percent | Percent | Percent | Percent |
| None (control) | 11 | 38 | 75 | 26 | 14 | 71 | | |
| Soldium sulfite | 21 | 44 | 81 | 70 | 25 | 76 | 54 | 20 |
| Sodium bisulfite | 28 | 44 | 82 | 72 | 25 | 76 | 45 | 25 |
| Potassium metabisulfite | 17 | 44 | 79 | 72 | 25 | 71 | 48 | 18 |
| Sodium sulfide | 23 | 44 | 88 | 72 | 39 | 82 | 47 | 19 |

This table shows that with skim and whole milk even at 40° F. an activator increases lactose conversion. The higher the temperature the faster the hydrolysis and the greater the need of an activator to bring about a maximum speed of conversion. For milks of normal concentration a temperature of 115° F. is optimum, and lactose conversion proceeds at a maximum rate. The low enzyme conversion rate at 123° F. is due to the low solids content of milks. Maximum conversion rates can be obtained in the presence of an activator at 123° F. or higher when more concentrated materials are used.

In general, whole milk will not under any conditions hydrolyze as readily as skim milk or whey but the per cent hydrolyses are in proportion.

In the examples, the per cent hydrolysis obtainable in the presence of a lactase activator in accordance with the invention is compared to a control in which no activator is present, in order to demonstrate the effect of the activator. The examples show that the lactase activator makes possible hydrolysis of over 50% of the lactose in a milk product without a heat or pasteurization treatment, or a condensation.

The lactase activator also is able to overcome the lactase-inhibitory effect of certain metal cations, especially iron and copper. In fact, in the presence of lactase activator the results may be as good as if the metal ion contaminants were not present. Such contaminants enter whey and like milk products from the processing equipment, and are not uncommon. The lactase activator may also act as a buffer to prevent change in pH during the lactase hydrolysis, in addition to controlling growth of acid producing bacteria, due to natural alkalinity or acidity and/or antibacterial action of the activator.

The dry and concentrated liquid hydrolyzed milk products produced in accordance with the invention have a variety of uses and can in fact be employed wherever milk products or milk solids are ordinarily used. The dry product is characterized by a high solubility in water, even at low temperatures, compared to lactose-containing milk products; both the dry and the concentrated liquid products are reconstitutable with water or milk to form a milk product, having any desired solids content.

The dry product may also be used in the preparation of animal feeds. Animal feeds usually cannot contain a large amount of milk solids, because of the cathartic effect of lactose, but when the milk product prepared as set forth herein is used, a higher proportion of milk solids than are ordinarily employed can be used because the glucose and galactose therein have no bad effects.

In seasons when milk is plentiful it is customary to concentrate the excess quantities of skim milk and freeze it for later use in ice cream. However, the frozen concentrated product cannot be stored for too long a period because the product age-thickens. In contrast, concentrated skim milk products in which the lactose has been hydrolyzed in accordance with the present invention can be frozen and stored without danger of age-thickening. Similarly, concentrated whole milk products whose lactose has been hydrolyzed as herein set forth do not age-thicken.

Whey products whose lactose content has been hydrolyzed to glucose and galactose can be concentrated to a 50% solids content or more without danger of lactose crystallization. The concentrate is substantially fluid and can be transported in tank cars and trucks in bulk quantity.

Whole and skim milk concentrates which do not contain appreciable amounts of lactose can be concentrated to a solids content at which the ratio of sugar and water is optimum for the prevention of bacterial growth. Such concentrates do not require sterilization, which is necessary in producing evaporated whole milk.

Various modifications and changes may be made in the conditions under which the process of the invention is carried out, as will be apparent to those skilled in the art, and it will be understood that the invention is not to be limited except as set forth in the following claims.

All parts and percentages are by weight.

We claim:

1. A process of hydrolyzing lactose contained in a liquid milk product to lactose hydrolytic sugars including glucose and galactose which comprises adding thereto an enzyme preparation in which the enzyme consists essentially of lactase enzyme and a supplemental lactase activator containing in the molecule an active sulfur atom associated in a group selected from the class consisting of sulfide, hydrosulfide, sulfite, bisulfite, metabisulfite, hyposulfite, thiosulfate, mercapto, and sulfur dioxide, and holding the product in the presence of the lactase activator under conditions favoring lactase hydrolysis of lactose to lactase hydrolytic sugars including glucose and galactose until there is obtained a product containing such hydrolytic sugars formed by lactase hydrolysis of the lactose, the remaining sugar content other than such hydrolytic sugars being unhydrolyzed lactose.

2. A process in accordance with claim 1 in which the milk product is skim milk.

3. A process in accordance with claim 1 in which the milk product is whey.

4. A process in accordance with claim 3 in which the milk product is cheddar cheese whey.

5. A process in accordance with claim 1 which includes arresting the hydrolysis after it has proceeded to the desired extent by inactivating the enzyme.

6. A process in accordance with claim 1 which includes holding the enzyme containing product at a temperature in the range from 25° to 135° F.

7. A process in accordance with claim 1 which includes heating the milk product for a time and at a temperature not over the range from 175° F. for fifteen seconds to 125° F. for thirty minutes to lessen bacterial action.

8. A process in accordance with claim 1 which includes pasteurizing the hydrolyzed product by a holding method in order to inactivate the lactase enzyme.

9. A process in accordance with claim 1 which includes drying the hydrolyzed product.

10. A process in accordance with claim 1 which includes spray-drying the hydrolyzed product.

11. A process in accordance with claim 1 which includes concentrating the hydrolyzed product to a solids concentration up to 75%.

12. A process in accordance with claim 1 which includes concentrating the milk product to a solids content in the range of from 20% to 50% prior to the hydrolysis.

13. A process in accordance with claim 1 in which the lactase activator is a hydrosulfide.

14. A process in accordance with claim 1 in which the lactase activator is a sulfide.

15. A process in accordance with claim 1 in which the lactase activator is a sulfite.

16. A process in accordance with claim 1 in which the product containing hydrolytic sugars is subjected to conditions favoring conversion of the lactase activator to edible by-products.

17. A process in accordance with claim 1 in which the product containing hydrolytic sugars is subjected to conditions favoring conversion of the lactase activator to volatile by-products and removing the said volatile by-products from the milk product.

18. A process in accordance with claim 1 in which the lactase enzyme is a lactase-active zymase-inactive yeast enzyme preparation.

References Cited in the file of this patent

Chemistry and Technology of Enzymes, by H. Tauber, copyright 1949, pub. by John Wiley and Sons, Inc., pages 8, 57, 58.

General Chemistry of the Enzymes, by H. Euler, 1st ed., pub. 1912 by John Wiley and Sons, pages 30, 31, 100, 168, 169, 170, 171.

The Enzymes, vol. II, part 2, by J. B. Sumner, K. Myrback, pub. 1952 by Academic Press, New York, pages 1327, 1328.